United States Patent [19]
Hatanaka et al.

[11] Patent Number: 4,922,094
[45] Date of Patent: May 1, 1990

[54] AUTOMOBILE ELECTRONIC LIGHT-ACTIVATED KEY DEVICE

[75] Inventors: Toshihiko Hatanaka, Wakayama; Akira Enomoto; Kouji Matsushita, both of Mie, all of Japan

[73] Assignee: Navic Co., Ltd., Mie, Japan

[21] Appl. No.: 263,608

[22] Filed: Oct. 27, 1988

[30] Foreign Application Priority Data

| | | | |
|---|---|---|---|
| Nov. 6, 1987 | [JP] | Japan | 62-170319[U] |
| Nov. 6, 1987 | [JP] | Japan | 62-170322[U] |
| May 31, 1988 | [JP] | Japan | 63-133825 |
| May 31, 1988 | [JP] | Japan | 63-133826 |

[51] Int. Cl.[5] .......... G01V 9/04
[52] U.S. Cl. .......... 250/221; 341/31
[58] Field of Search .......... 250/221, 222.1, 229; 340/555, 556, 557, 542, 571, 572, 825.31; 341/31

[56] References Cited

U.S. PATENT DOCUMENTS

| | | | |
|---|---|---|---|
| 3,340,401 | 9/1967 | Young | 250/221 |
| 3,885,408 | 5/1975 | Clark | 250/221 |
| 4,254,333 | 3/1981 | Bergstrom | 250/221 |
| 4,340,813 | 7/1982 | Sauer | 250/221 |

*Primary Examiner*—David C. Nelms
*Attorney, Agent, or Firm*—Koda & Androlia

[57] ABSTRACT

An automobile electronic key device for externally and keylessly unlocking the vehicle door lock is disclosed. The electronic key device provided near the inner side of the vehicle lateral window glass includes plural pairs of light emitting and receiving elements, to which predetermined AC signals are supplied from the light emission controlling circuit. External manual stroking operation on said light emitting-receiving elements generates ID signals, which are supplied to the received light processing circuit, which synchronously processes the inputted ID signal with said AC signal. The unlocking device functions to compare the ID signal to the registered member and unlocks the vehicle door lock upon identifying them.

3 Claims, 6 Drawing Sheets

AUTOMOBILE ELECTRONIC LIGHT-ACTIVATED KEY DEVICE

BACKGROUND OF THE INVENTION

1. Field of the Invention

The present invention relates to an automobile electronic key device, and more particularly to an improvement of electronic key devices for keylessly releasing the door lock of an automobile from the exterior.

2. Description of the Prior Art

Door lock device plays a very important role to prevent automobile theft. But it requires the user always to carry and use a key.

In particular, a problem frequently occurs when the door is locked with the key left in the car. Under these circumstances, a keyless entry system has been strongly desired.

Conventional keyless entry systems have been realized under the synchronicity of theft-prevention and destruction by mischief.

Such an existing keyless entry system usually comprises a keyboard installed on the external surface of the vehicle body, for instance marginal edge portion of door handle. The user can input a predetermined specific ID number as plural digits through said keyboard, and the identification thereof with a predetermined registered number results in lock cancellation.

This conventional technique to increases theft prevention as well as many of other identical type systems and have gained public favor particularly for high-class motor cars.

Said conventional keyboard type electronic key devices, however, have been disadvantageous in being able to be destroyed or to become inoperative because of the keyboard located outside of the vehicle.

Conventional keyless entry systems, in spite of the theft preventing effect thereof, has been powerless to prevent destruction thereof which results in making it impossible to unlock and expensive to be repaired.

Besides such an intentional theft case, an externally exposed keyboard easily becomes a target of mischiefs which of thereby easily lead it to be inoperative.

SUMMARY OF THE INVENTION

It is therefore an object of the present invention to provide an improved automobile electronic key device not being subject to external destruction or mischiefs.

For this end, the present invention aims to provide a non-contact type ID sensor near the inner side of the vehicle windshield. Accordingly, the user can freely input an ID number signal through the transparent windshield without direct contact with the on-contact type ID sensor.

In this invention, a predetermined AC signal drives the light emitting element of said non-contact ID sensor. The reflecting signal received through the light receiving element is synchronously processed with said AC current supplied to said light emitting diode to eliminate noise invasion therein.

Further, the non-contact ID sensor includes several pairs of light receiving and emitting elements. External manual stroking operation through the windshield leads to input ID the number signal.

Accordingly, this invention can provide a keyless entry device of high reliability without fear of being subject to external destruction and without externally exposed parts.

DESCRIPTION OF THE PREFERRED EMBODIMENT

Figure 1:
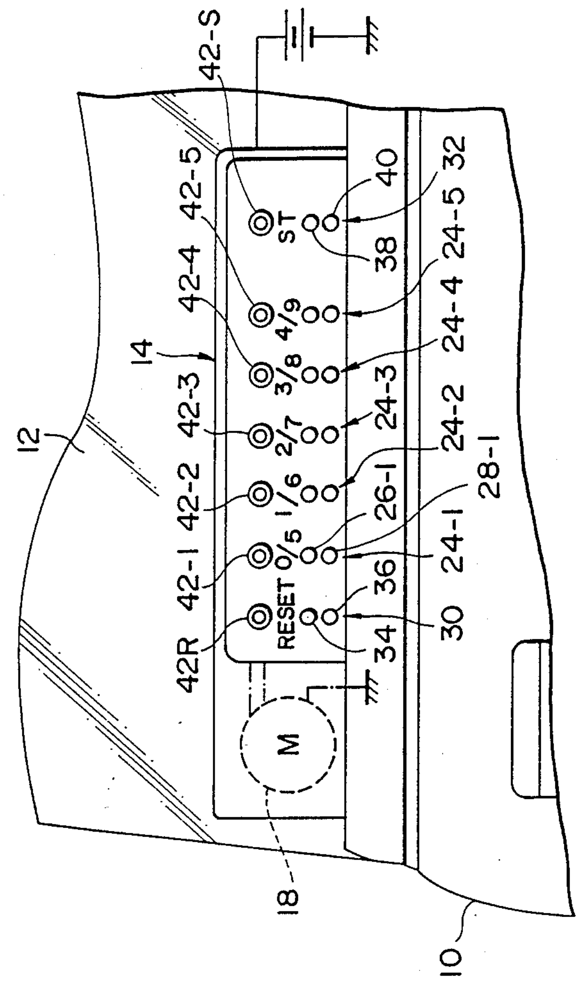
FIG. 1 illustrates the automobile electronic key device according to the present invention mounted on the inner side of an automobile lateral window.

FIG. 1 shows a perspective view of the automobile electronic key device mounted on the inner side of lateral window of a vehicle according to the present invention.

Figure 2:
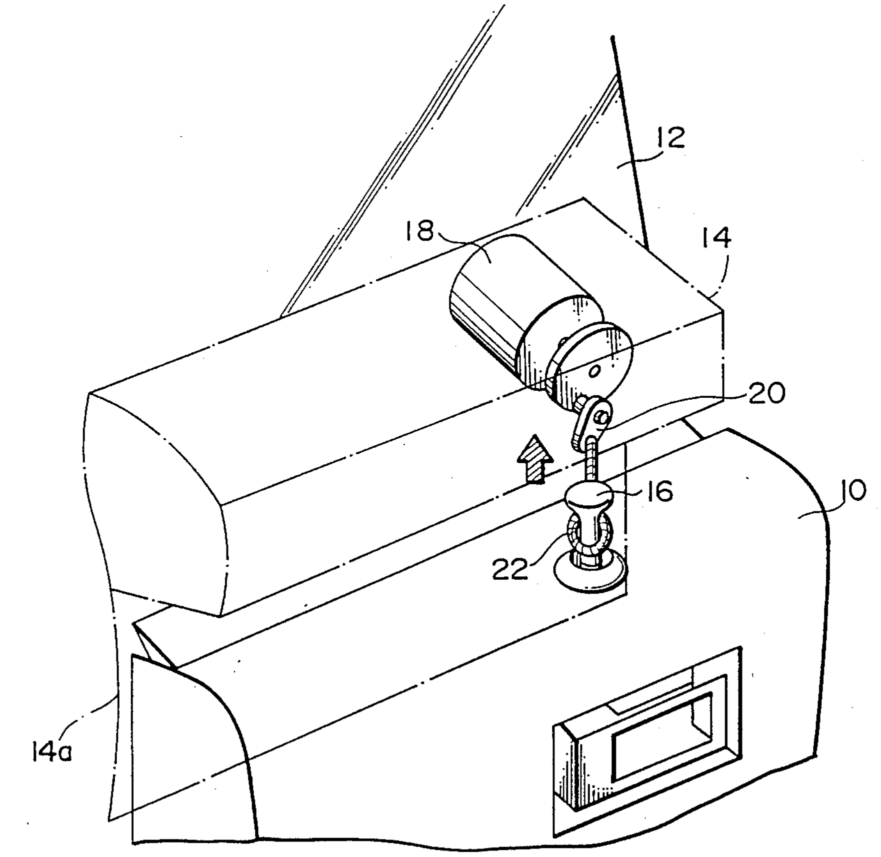
FIG. 2 illustrates a perspective view of the key device according to the FIG. 1, observed from the inner side of the automobile.

The key device 14 is an optional equipment which can easily be incorporated and released from the automobile. As clearly understood from the inner side view of the FIG. 2, the electronic key device 14 has a fixing plate 14*a* on the front surface consisting of a flat and thin material extending downwardly from the body. This fixing plate carried between the door 10 and the windshield 12 functions to firmly hold the electronic key device on the door 10 without difficulty.

The electronic key device according to the present invention includes a unlocking device to release the door lock therein. In the present embodiment, said unlocking device is provided with a unlocking motor 18 to pull up the door lock knob 16 by means of the crank cam 20 secured to the rotary shaft of the motor 18 and the pulling strap 22. The pulling strap is formed from hard rubber or the like such as to be easily put on the knob 16 in desired types of automobiles.

Of course, in this invention, said unlocking device can be composed in other way than the shown motor driven type, i.e. energized solenoid pulls up the core fixed to the door lock knob 16 for locking, or unlocks by pushing down it.

FIG. 1 shows the electronic key device comprising several pairs of emitting-receiving elements. In the shown embodiment, five ID inputting element pairs are arranged on the surface thereof in vicinity to the inner side of the window glass 12. These element pairs 24 consist of emitting element 26 and receiving one 28.

The emitting-receiving elements pairs 24 form a non-contact ID sensor for this invention, and the element pair 24-1 serves to input the number 0 and 5. In the same manner, 24-2 for 1 and 6. And each element pair of 24-3, 24-4, 24-5 is used to input two numbers, 2 and 7, and 3 and 8, and 4 and 9, respectively.

The electronic key device 14 also includes resetting emitting-receiving element pair 30 and starting pair 32, each consisting of emitting element 34 and receiving element 36, and 38 and 40, respectively.

For each of emitting element 26, 24 and 38 is used LED. The emitting frequency thereof can be freely selected from visible light, infrared light or far infrared ray. Each of light-receiving element 28, 36, 40 consists of phototransistor or photodiode.

Light emitting surface or light receiving surface of the both light emitting and receiving elements 28 are directed externally to avoid directly invading the light from the corresponding light-emitting element 26,34,38 located in vicinity thereof into the paired light emitting elements 28, 36 40.

Under this constitution, external manual or other touching operation on the light emitting-receiving element pair results in projection of reflecting light to the light receiving element, the light being captured by the electronic key device 14, thereafter.

Said non-contact touching operation through the window glass has allowed the electronic key device to receive easily the input number signal and to be installed in the vehicle passenger compartment without external exposition.

And in the shown embodiment, displaying LED 42 provided above said light emitting receiving element pairs 24,30 and 32 function to clearly identify the position of each non-contact ID sensor even in the day or night.

Then the user can easily recognize if the ID input has been certainly carried out.

Figure 3:
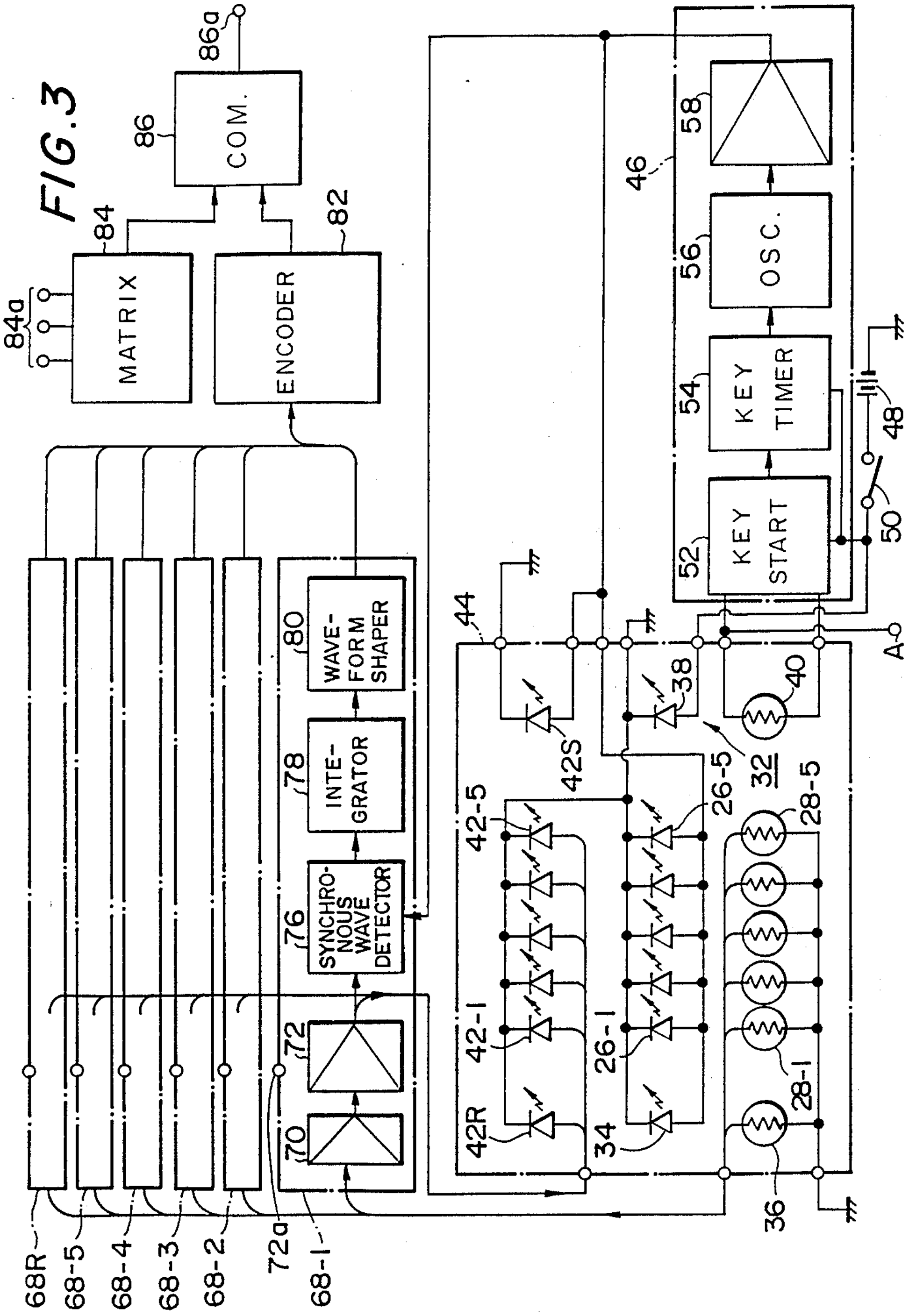
FIG. 3 illustrates an integral circuit of the automobile electronic device according to the present invention.

FIG. 3 illustrates the entire circuit composition of the electronic key device according to the present invention. The numerical code 44 designates the non-contact ID sensor which comprises light emitting-receiving elements pair to input said resetting or starting ID signal and displying LED.

Light emission controlling circuit 46 supplies predetermined AC signals to the light emitting element of the non-contact ID sensor 44. The light emitting element 26, 34 and the displaying LED **42*s* receives the output AC signal from said light emission controlling circuit 46**.

At the same time the output of said light emission controlling circuit 46 enters also to later-explained received light processing circuit as synchronous signals to prevent erroneous external ID input by invading noise.

In the shown embodiment, the light emission controlling circuit 46 sets the electronic key device in operation over a predetermined lapse, i.e. seven seconds upon receiving signals from the light receiving element 40, and invalids the input operation if it has not correctly carried out.

In normal state, power supply to the non-contact ID sensor 44 is shut down except starting light emitting element 38 and inoperative. Further, said starting light emitting element 38 also receives operative power from the reverse switch 50 through the automobile battery 48, which is held in the off state during the ignition switch of the vehicle being in the operative state.

Then, passing a finger over the starting light emitting-receiving element triggers the starting the light emission controlling circuit.

The key starting circuit 52 processes said starting signal which operates to the key timer 54 wherein the apparatus is held at an energized state for a predetermined lapse.

When said key timer 54 operates, oscillator 56 receives power to output AC signals of a predetermined frequency. The output signals are supplied to each light emitting element 26, 34, and to the received light processing circuit after being amplified by the amplifier 58.

Figure 4:
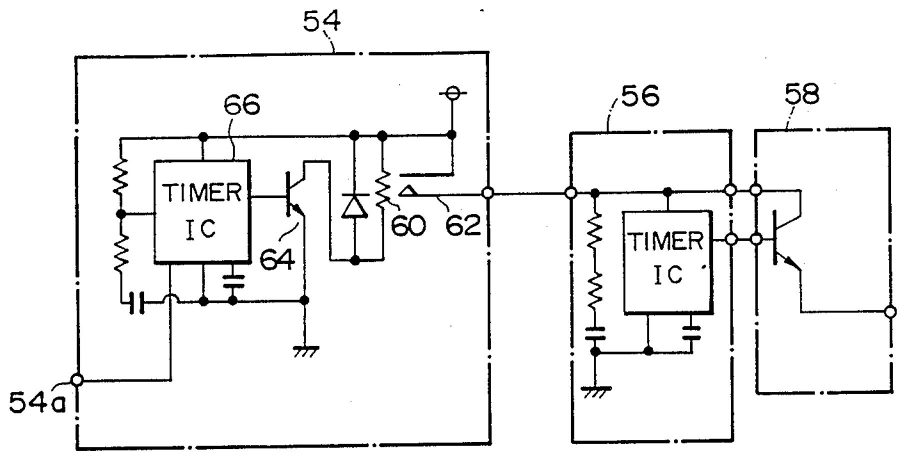
FIG. 4 illustrates a practical embodiment of the light emission controlling circuit in the FIG. 3.

FIG. 4 illustrates preferred embodiment of said light emitting element controlling circuit. Key timer 54 includes a relay coil 60, relay contact 62 and transistor 64 for supplying AC to said relay coil. Only when the transistor 64 is at on state the contact 62 become closed to supply voltage to the following oscillator 56.

Timer IC 66 is utilized to operate the transistor 64 for a predetermined time, i.e. seven seconds, in response to the trigger signal transmitted from the key starting circuit 52 through the input terminal **54*a*. The ON-operating lapse can be freely established by varying the capacitance of the condenser connected to the external part of said IC 66**.

Upon receiving the starting signal from the starting light emission-reception elements pair 32, the key starting circuit 52 supplies power to the oscillator 57 for a predetermined time. Then the oscillator outputs oscillating signals of predetermined frequency, 1000–10 KHz for example.

The oscillating signal amplified by the amplifier 58 enters to the non-contact ID sensor 44.

The output of the light emission controlling circuit 46 is directly supplied to the start displaying LED **42*s*, the lighting of which indicates that the touching operation over the starting light emitting-receiving elements pair 32 has been accepted. The lighting of LED 42*s* indicates the stand-by state of electronic key device to receive the ID number. At this time, the output from the light emission controlling circuit 46 functions to supply driving currents and lightens the light emitting elements 26 for inputting the ID number and resetting the light emission element 34**.

External passing operation of the finger over the desired inputting light emitting-receiving elements pair 24 through the windshield can input the predetermined ID number and resetting light emission element 34.

External Passing operation of finger over the desired inputting light emitting-receiving elements pair 24 through the windshield can input the predetermined ID number signal in operating order thereof which is served to correspondingly be displayed by LED 42.

Erroneous inputting operation can be easily cancelled by indirect touching operation of the resetting light emission-reception element 30.

Each sensor independently processes the received light of said ID input signal so received light processing circuit consists of six circuits 36, each of which has an identical configuration. For simplification only the ID number inputting light reception element 28-1 and the corresponding received light processing circuit 68-1 will be described in the following explanation.

Figure 5:
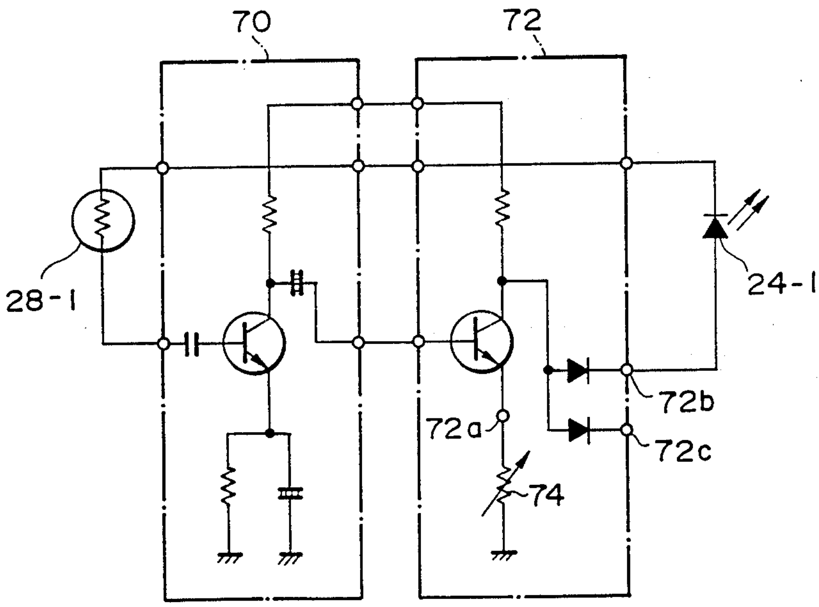
FIG. 5 illustrates a former part of the received light processing circuit in the FIG. 3.

Received light processing circuit 68, as shown in FIG. 5, includes double amplifiers 70, 72. The former 70 is the initial amplifier which acts to amplify the ID inputting signal from the light reception element 28-1 which, while the latter 72 establishes the level of the signals supplied thereto through the terminal **72*a***.

In this embodiment shown in the FIG. 5, the terminal **72*a* supplies the output from the externally adjustable variable resistor 74 to the transistor of the amplifier 72. This means the degree of amplification of the amplifier 72 can desirably be adjusted by the variable resistor 74**.

The output from the amplifier 72 through the terminal **72*b* enters to said displaying LED 42-1. In consequence, the user can assure if the through ID signal input operation has been correctly performed through the light emitting-receiving elements pair 24-1**.

Further, the ID input signal is supplied to the synchronous wave detecting circuit 76 from the output terminal of the amplifier 72, to synchronously process it with AC signals from the light emission controlling circuit.

Synchronous wave detecting circuit 76 functions to assure if the reflecting signal received by the light receiving element has been identified with the AC signal of the light emission controlling circuit, by synchronous wave detection operation. Its output is thereafter processed by the integrator 78 and wave form shaper 80, and enters to the encoder 82.

According to this received light processing circuit, input of optical noise as sun light or the like into each light receiving element can be eliminated.

ID signal inputted in the above manner then will be sequentially received by the encoder 82 of the lock releasing device, which encodes the ID signals into numerical row with four digit.

Said unlocking device includes the matrix circuit 84 and the comparator 86. Predetermined registered number for each vehicle enters the matrix 84 through the input terminal 84*a*. The comparator 86 compares the registered number with the encoded signal from said encoder 82, and outputs a driving signal to the motor 18 shown in FIG. 1 when the compared both numbers are identified.

Therefore, the identification of ID number input and the registered number immediately allows the door lock knob 16 to be pulled up by the rotation of the motor 18, to unlock it.

In this manner, according to this embodiment, the input operation of the start sensor excites the ID number inputting sensor from which number of four digit will be supplied. The identification of number with the registered number performs unlocking, which requires no other complex operation or unlocking by key.

The second embodiment according to this invention will be explained hereafter. In said first embodiment inputting operation for key less entry has been entirely carried out in an optical process. Particularly in the starting operation, battery currents were always supplied to the starting light emission element 38 so long as the ignition switch 50 is in off state.

Contrary thereto, in this embodiment the starting input operation consists the of user's intentional and mechanical operation, which requires no continuous currents supply and consumes reduced currents.

Figure 6:
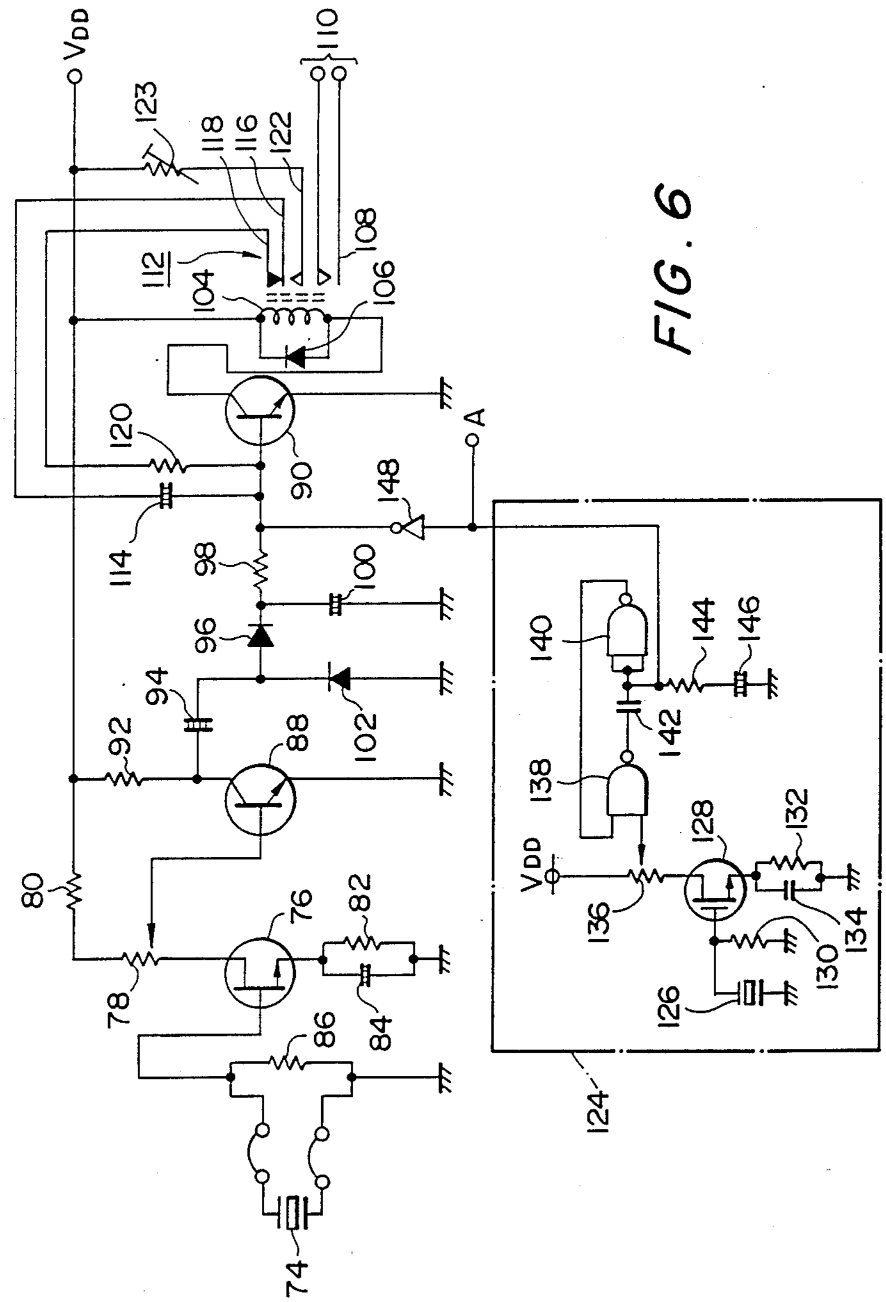
FIG. 6 illustrates an automobile theft-preventing alarm device including a reset circuit adopted in the second embodiment of the present invention.

Constructional feature of this embodiment lies in the reset circuit 126 enclosed by the chained line in FIG. 6 connected to the terminal A. This terminal A is attached to the non-contact ID sensor 44 in the FIG. 3. In this embodiment, the current supply for the starting light emitting element 38 starts upon user's external knocking operation on the piezoelectric type shocking sensor in the reset circuit 126. This eliminates the requirement to always supply currents to the predetermined element for abrupt starting input and to greatly reduce using cost as an entire device.

Here the whole FIG. 6 including the reset circuit 126 shows an automobile theft preventing alarm device, which features to be composed such as to maintain theft prevention stand-by condition for a long time without causing discharged battery, by said currents reducing effect.

This device includes a piezoelectric type shocking sensor fixed to the desired position on the vehicle body to reduce the shocking accelerated pressure generated at the theft time. Input FET is used therein to capture the week electric signal generated by the piezoelectric shocking sensor over a predetermined thereshold level.

Upon being received a shocking acceleration over a predetermined value, alarms in response to the alarm signal supplied from the input FET through the amplifying circuit and timer circuit.

The reset circuit 124 connected to the electronic key device shown in the FIG. 3 functions to make the theft preventing alarm device stop or reset upon the occurrence of erroneous alarm operation. The connection of the reset circuit 124 to the point A of the electronic key device in the FIG. 3 allows the reset circuit 124 to be used in common with the automobile theft preventing alarm device and the electronic key device.

The following is the explanation of vehicle theft preventing alarm device including the reset circuit 124 according to the entire FIG. 6. And thereafter, that of concrete operation when said reset circuit 124 is connected to the electronic key device according to the FIG. 3.

In the FIG. 6, the piezoelectric shocking sensor 74 is secured to the desired position of the vehicle body. It generates an electric signal upon sensing a shock being externally given.

The piezoelectric shocking sensor 74 in this embodiment uses a piezoelectric element generally employed in a speaker, and being mounted on the vehicle body. The other output end enters the gate of the input FET. Accordingly, the base input voltage of the FET 76 varies upon being excited with pulse-like voltage on the both ends of the sensor 74 at sensing a shocking acceleration. The FET 76 has a source connected to the power source through the sensitivity adjusting resistor 78 and the resistor 80, and a drain grounded through a parallel circuit consisting of the resistor 82 and the condenser 84.

Therefore, FET 76 turns on when the induced voltage of the sensor 74 comes over a predetermined value.

The sensor 74 has a protecting resistor 86 with a high resistive value in parallel thereto which leaks the excessive currents. It is preferable that the protecting resistor 86 is established in afored 5M.

In this manner, according to the present invention, only the piezoelectric shocking sensor 74 and the input FET 76 are always in a monitoring-standby condition. Said sensor 74, of course, does not consume current. Further the input FET consumes little current because it is voltage-driven type, as is well known.

In consequence, said both elements consumes quite small current even if they are put in continuous theft monitoring stand-by condition.

Because of being a voltage-driven type, the input FET 76 can not supply enough current to drive the alarm or vehicle horn by itself. The amplifier circuit including the transistor 88 and 90 is provided to amplify these currents.

The former transistor 88 has a base connected to the power supply through the resistor 92, and the emitter grounded.

This former transistor 88 maintains the OFF state until its base input reaches a predetermined value. The ON operating input voltage can be freely adjusted by said variable resistor 78 in order to obtain the desired sensitivity at device manufacturing process or vehicle parking time. This enables the device not to set off the alarm upon getting a small shock generated by normal use and to be adjusted for sensing only large shocks during theft occurrence.

The collector of the transistor 88 is connected to the base input of the transistor 90 after eliminating the high frequency noise part thereof by the low pass filter consisting of the resistor 98 and the condenser 36, through the condenser 94 and the diode 96. One end of said condenser 94 is grounded through the back current preventing diode 102.

In this way, the on operating signal of the former transistor 88 has its high frequency component eliminated and then acts to drive the transistor 90.

The transistor 90 has an emitter grounded and a collector connected to the power source through the relay coil of the alarm inputting circuit. Diode 106 is connected in parallel to the relay coil 104. The alarm contact 108 connected to the relay coil 104 closes at the ON operation of the transistor 90 so as to supply drive signal to the vehicle horn circuit from the alarm output terminal 110 in the embodiment. Then, the horn will be sounded during the ON operating condition of the transistor 90.

According to the present invention, the timer circuit is provided to limit the outputting time of said alarm output circuit.

The timer circuit holds the base input of the transistor 90 by the timer contact 112 driven by said relay coil 104. More concretely, it includes a timer condenser 114 connected to the base input of said transistor 90, the common contact 116 connected to the condenser 114, resistor 120 provided between the constantly closed contact 118 and the base input of the transistor 90, and timer time adjusting resistor 123 between the constantly opened contact 122 of the timer contact 117 and the power supply.

When said input FET turns ON and the former transistor 88 amplifies it, transistor 90 detects the ON operation of the transistor 88 and turns ON to supply energizing currents to the relay coil 104 from the power supply. Then the contact position of the timer contact 122 changes and charging current will be supplied to the condenser 120 from the power supply through the resistor 123, constantly opened contact 122, common contact 116. The resistor 120 is held opened by the constantly closed contact 118.

Accordingly, the charging current of the condenser 114 controls the base input of the transistor 90 at ON state until the condenser 114 being charged reaches to a predetermined voltage, regardless of the ON-OFF state of the former transistor 88. Upon completing the charging, the transistor 90 will turns OFF and said alarm output stops.

In the shown embodiment, the timer time is set at in several seconds which can be freely selected by charging the value of the resistor 123.

Besides said timer circuit, this embodiment includes a circuit to allow the user to reset the device when erroneous alarming function happens. This resetting function is carried out by grounding the base input of the transistor 90 at said alarming time. Such a grounding circuit can be composed for instance by insertion of door lock releasing key or photoelectric detecting signal input.

The reset circuit 124, in the embodiment, starts to function in response to receiving the particular external shock detected by the piezoelectric shocking senser used as well as for theft detection. The piezoelectric shocking sensor 126 of the reset circuit 124 detects the particular shock given, i.e. by knocking the door mirror, so as to output reset signal.

Of course, such a particular shock must be completely different type shock from the one for said theft detection. Therefore, the theft shock given to the sensor 126 of the reset circuit 124 is selected to be distinguished from that given to the sensor 10.

The sensor 126 of the reset circuit 124 is connected to the gate input of the FET 128 and the high-valued resistor 130 is connected in parallel thereto.

Said FET 128 has a drain to which the parallel circuit consisting of the resistor 132 and the condenser 134 is connected and a source to which power supply voltage is supplied thereto through the variable resistor 136.

Further, the output from the variable resistor 136 is directed to the amplifying circuit consisting of the nand gate 138 and 140, condenser 142, resistor 144 and condenser 140.

Accordingly, the sensor 126 certainly detects the particular shock given to said door mirror or the like, the output of which triggers the supply of base input to the transistor 90 from the reset circuit 124 through the emitter 148.

In consequence, the user can quickly stop the carelessly erred alarming function by shocking the door mirror in a certain manner, i.e. knocking which leads the device to be reset.

In the reset circuit 124, as well as the alarm device, only the sensor 126 and the FET 128 both of which are located at the input side remains in continuous stand-by condition, whereas the amplifier normally is in the OFF state. This means it requires quite reduced currents to be consumed.

As explained above, this invention has enabled realization of reliable theft alarming function with very small consumed currents, by sensing the occurrence of a theft only with the piezoelectric shocking sensor 74 and the input FET 76.

By connecting the reset circuit 124 to the A point of the FIG. 3, the user's knocking operation triggers the current supply from the battery 48 to the starting light emission element 38 to start external unlocking operation.

Consequently, this embodiment does not require continuous currents supply to the starting light emission element 38 after opening the ignition switch 50. The current supplied is enough to be carried out upon receiving user's knocking operation, which remarkably serves to reduce the consumed current and using cost.

Further, the electronic key device as shown in the FIG. 1 can be also used as reset signal inputting means instead of the piezoelectric type shocking sensor of the reset circuit 124 in the FIG. 6.

Figure 7:
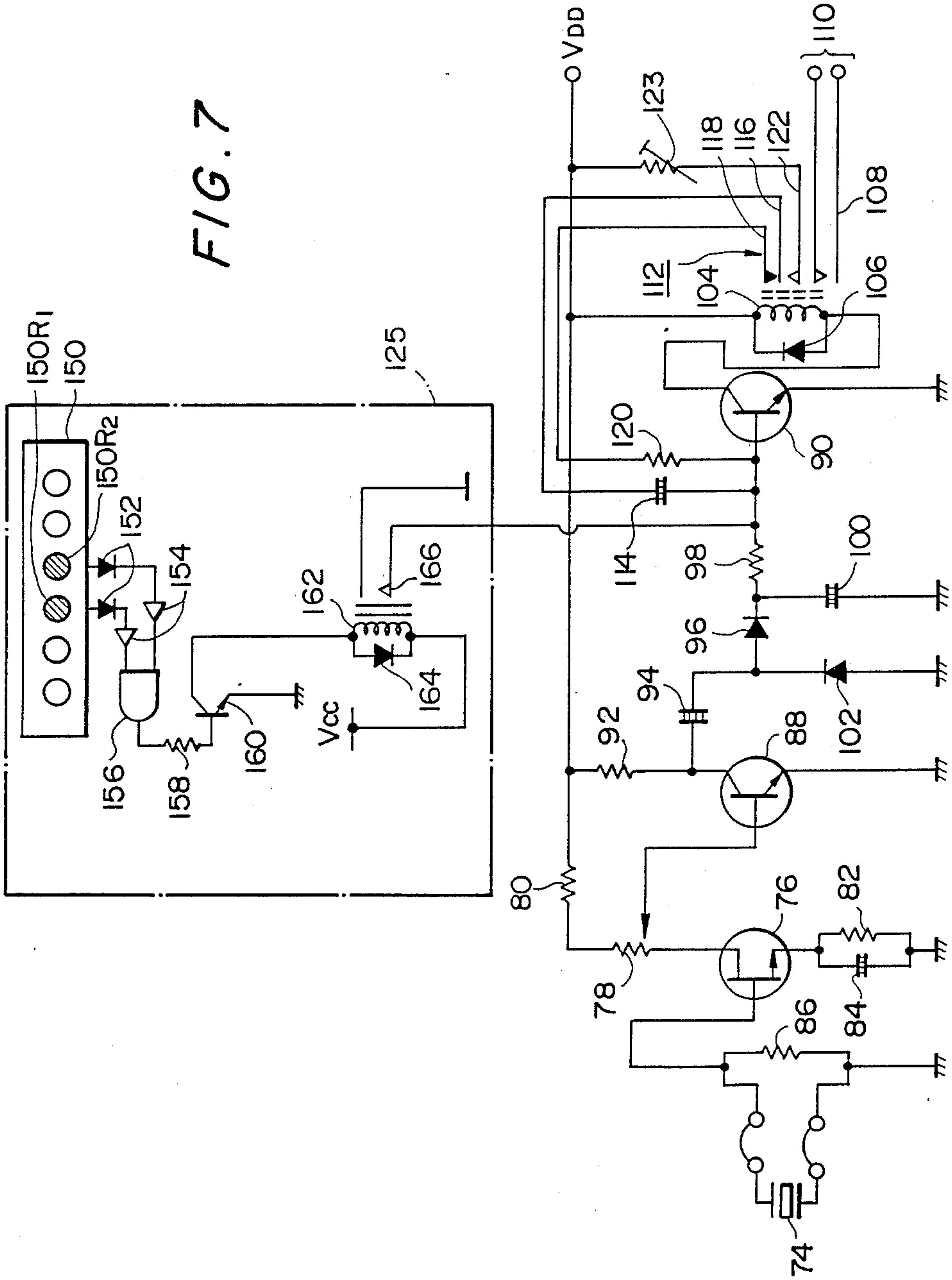
FIG. 7 illustrates an other embodiment of an automobile theft-preventing alarm device including a reset circuit adopted in the second embodiment of the present invention.

In the automobile theft-preventing alarm device shown in the FIG. 7, the reset circuit 125 includes a electronic key device 150 having a plurality of light emitting-receiving elements arranged in alignment, among which the elements 150 $R_1$ and 150 $R_2$ are provided as resetting elements.

Explanation for the basic composition and operation of the electronic key device 150 will be omitted as being equal to that in the FIGS. 1 and 3.

To stop the alarming function intentionally, the user strokes the both two resetting elements 150 $R_1$ and 150 $R_2$ from exterior of the vehicle. The inputted resetting signals from the elements 150 $R_1$ and 150 $R_2$ enter to the gate 156 through the diode 152 and the inverter 154. Upon both resetting signals being correctly inputted, the gate 156 supplies base voltage for the transistor 160 through the resistor 158. The collector of the turned ON transistor 160 is connected to one terminal of the relay coil 162, the other terminal of which is connected to the power source. Diode 164 is inserted between the both terminals. Then the turned ON transistor 160 leads the energizing current to the relay coil 162 from the power source, which closes the resetting contact 166 to provide, resetting signal to the base of the transistor 90.

In this way, this invention can certainly prevent the destruction of or mischiefs to the electronic key device, by providing a non-contact CD sensor at the inner side of the automobile window glass and to energize it by an externally stroking operation.

What is claimed is:

1. An electronic key device for keylessly unlocking an automobile door lock from an exterior, comprising:

a non-contact ID sensor including a plurality of pairs of light emission elements and light receiving elements with light emission and reception surfaces thereof being directed externally of and provided adjacent to an inner surface of a window glass of the automobile, said non-contact ID sensor for detecting an ID signal generated by externally stroking an outer surface of the window glass over ones of said plurality of light emitting-receiving element pairs;

a light emission controlling circuit for supplying AC signals to said light emitting element at a predetermined frequency;

a non-contact operation start triggering means for causing said AC signals to be supplied to said non-contact ID sensor from said light emission controlling circuit when said non-contact operation start triggering means is actuated;

a received light processing circuit which synchronously processes the AC signals from the light emission controlling circuit together with the reflected signal captured by said light receiving elements upon the ID signal being inputted; and an unlocking device which unlocks the vehicle when a correctly inputted ID signal is determined by comparing said processed ID signal with a predetermined registered number.

2. An electronic key device for keylessly unlocking an automobile door lock from an exterior, comprising:

a non-contact ID sensor including a plurality of pairs of light emission elements and light receiving elements with light emission and reception surfaces thereof being directed externally of and provided adjacent to an inner surface of a window glass of the automobile, said non-contact ID sensor for detecting and ID signal generated by externally stroking an outer surface of the window glass over ones of said plurality of light emitting-receiving element pairs;

a light emission controlling circuit for supplying AC signals to said light emitting element at a predetermined frequency;

a non-contact operation start triggering means for causing said AC signals to be supplied to said non-contact ID sensor from said light emission controlling circuit when said non-contact operation start triggering means is actuated, said non-contact operation start triggering means comprising a shock-type sensor provided adjacent said inner surface of said window glass for sensing and being actuated by a user's mechanical knocking;

a received light processing circuit which synchronously processes the AC signals from the light emission controlling circuit together with the reflected signal captured by said light receiving elements upon the ID signal being inputted; and an unlocking device which unlocks the vehicle when a correctly inputted ID signal is determined by comparing said processed ID signal with a predetermined registered number.

3. An electronic key device for keylessly unlocking an automobile door lock from an exterior, comprising:

a non-contact ID sensor including a plurality of pairs of light emission elements and light receiving elements with light emission and reception surfaces thereof being directed externally of and provided adjacent to an inner surface of a window glass of the automobile, said non-contact ID sensor for detecting an ID signal generated by externally stroking an outer surface of the window glass over one of said plurality of light emitting-receiving element pairs;

a light emission controlling circuit for supplying AC signals to said light emitting element at a predetermined frequency;

a non-contact operation start triggering means for causing said AC signals to be supplied to said non-contact ID sensor from said light emission controlling circuit when said non-contact operation start triggering means is actuated, said non-contact operation start triggering means comprising another pair of a light emission element and a light receiving element provided adjacent said inner surface of said window glass for sensing and being actuated by a user's finger being placed on an exterior surface of said window glass over said another pair of said light emission-receiving elements;

a received light processing circuit which synchronously processes the AC signals from the light emission controlling circuit together with the reflected signal captured by said light receiving elements upon the ID signal being inputted; and an unlocking device which unlocks the vehicle when a correctly inputted ID signal is determined by comparing said processed ID signal with a predetermined registered number.

* * * * *